Patented July 11, 1944

2,353,210

UNITED STATES PATENT OFFICE 2,353,210

NONCORROSIVE DIACETONE COMPOSITION

Sophia O. Williams, Chicago, Ill.

No Drawing. Application April 12, 1941,
Serial No. 388,347

10 Claims. (Cl. 252—73)

This invention relates to a non-corrosive diacetone composition which has been stabilized against the effect of heat and cold.

This application is a continuation-in-part of my co-pending application Serial No. 381,895, filed March 5, 1941, which was a continuation-in-part of a co-pending application Serial No. 298,693, filed October 9, 1939, and another application Serial No. 311,681, filed December 29, 1939.

Diacetone (diacetone alcohol)

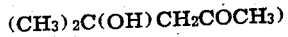

is an inexpensive organic material of high boiling point, low freezing point, and moderate viscosity. It forms a composition of low freezing point when mixed with water and properly stabilized. Diacetone, however, is unstable at high temperatures and breaks down to give a variety of decomposition products including acetone. In my co-pending application 381,895 I have described means for stabilizing diacetone against temperatures at least as high as the boiling point of water, and for stabilizing diacetone-water mixtures against separation at low temperatures.

As therein set forth, this stabilization is accomplished by inclusion in the diacetone system of a buffering agent in sufficient quantity to produce a pH of not substantially more than 7.8 and preferably not below 4. The preferred range of pH is between 5.2 and 6.8.

Any suitable buffering system may be employed which will produce a buffered system of reasonable capacity in the ranges indicated.

The preferred system consists of a mixture of a polycarboxylic acid and an alkali metal salt of a polyvalent acid within the specified pH range of 4 to 7.8. For example, a very efficient and inexpensive system may be prepared by combining citric acid and disodium phosphate in proportions suitable for producing buffer mixtures of the above specified pH range. Similarly, metal salts of phthalic acid may be employed in combination with disodium phosphate or by themselves. Likewise, the system of potassium carbonate and butyric acid may be employed, although it is preferred to use alpha hydroxy isobutyric acid in place of n-butyric acid. The butyric acid-potassium carbonate system, however, has less capacity as a buffer; and for this practical reason other buffer systems of greater buffering capacity are preferred.

The following are examples of effective buffering systems:

I

| | C. c. |
|---|---|
| 0.1 molal citric acid | 36.8 |
| 0.2 molal disodium phosphate | 63.2 |

The above mixture may be added to diacetone at the ratio of 1 part of the buffer to 3 parts of diacetone, and the mixture will have a pH of 6.42 at room temperature. The temperature coefficient of pH was negligible.

II

| | C. c. |
|---|---|
| 0.1 molal citric acid | 61.5 |
| 0.2 molal disodium phosphate | 38.5 |

This buffer may be mixed with diacetone at the ratio of 1 part buffer to 3 parts diacetone and the mixture will have a pH of 5.4.

III

| | C. c. |
|---|---|
| 0.27 molal potassium acid phthalate | 25 |
| 0.2033 molal NaOH | 0.20 |
| Water to make | 100.00 |

This buffer solution may be mixed with diacetone in the ratio of 1 part of buffer mixture to 3 parts diacetone, and will produce a pH when mixed of 5.59.

IV

| | C. c. |
|---|---|
| 0.2 molal potassium acid phthalate | 25 |
| 0.203 molal NaOH | 11.63 |
| Water to make | 100.00 |

75 c. c. of this buffer solution may be mixed with 225 c. c. diacetone and will produce when so mixed a pH of 7.8 which is approximately the upper limit for stability.

Lower pH's than those noted may be used, but tend to develop polymerization and other side reactions under certain conditions and, therefore, are preferably avoided.

One of the largest potential uses of the diacetone mixture is as an anti-freeze solution. When so used, the material is in constant contact with various metals including various forms of iron, aluminum, zinc and tin. While the buffering solutions may be employed to bring the diacetone-water mixtures fairly close to the neutral point, thereby decreasing corrosion, there is a tendency for most effective stabilizing systems to be more corrosive than is now considered desirable in a cooling system.

The problem of selecting a suitable corrosion inhibitor is made much more difficult by reason of the naturally unstable nature of the diacetone instances where the buffer is described as "phthalate" it consisted of the buffer described in Example IV. supra, consisting of 25 c. c. of 0.2 molal potassium acid phthalate, 11.63 c. c. of 0.203 molal NaOH, and water to make 100 c. c. When the buffer is described as "phosphate citrate" it comprises the buffer shown in Example I, being 36.8 c. c. of 0.1 molal citric acid, and 63.2 c. c. of 0.2 molal disodium phosphate per 100 c. c.

*Table I*

| Sample | Buffer | Inhibitor | pH range | Loss of weight couple | Diacetone | Water | Total | Freezing point |
|---|---|---|---|---|---|---|---|---|
| Water | | | | Mg. 19.6 | | 19 | 19 | °C. |
| 1 | Phthalate | None | 7.8–7.2 | 13.7 | 13 | 22 | 35 | −12.2 |
| 2 | do | Acid chrome glucosate | 7.4–7.5 | 0.0 | 7 | 17 | 24 | −14.9 |
| 3 | do | Sulphonated olive oil | 7.5–7.1 | 10.6 | 4 | 19 | 23 | −16.6 |
| 4 | do | Sulphonated castor oil | 7.6–7.0 | 8.3 | 8 | 33 | 41 | −14.1 |
| 5 | do | Alox 800 | 6.5–6.0 | 11.5 | 3 | 26 | 29 | −17.5 |
| 6 | Phosphate citrate | None | 6.5 | 11.8 | 6 | 30 | 36 | −15.4 |
| 7 | do | Acid chrome glucosate | 6.5–7.9 | 5.1 | 4 | 23 | 27 | −16.7 |
| 8 | do | Sulphonated olive oil | 6.5–7.4 | 6.1 | 2 | 15 | 17 | −17.9 |
| 9 | do | Sulphonated castor oil | 6.3–6.2 | 8.5 | 3 | 18 | 21 | −17.7 |
| 10 | do | Alox 800 | 5.9–5.7 | 7.3 | 3 | 16 | 19 | −17.4 | and its ability to enter into polymerization formation or the development of complex materials whose nature is not completely understood.

For this reason conventional inhibitors are undesirable. Inorganic chromates, for example, develop complex reactions. Organic inhibiting agents have been found to be satisfactory, including organic chromate complexes.

As an example of suitable organic inhibitors, it has been found that sulfonated oils, particularly non-drying vegetable oils such as castor oil and cottonseed oil, hydroxy-ketones from the liquid phase oxidation of hydrocarbons, polyketohydroxycarboxylic acids and their low molecular weight alcohol esters, such as those of methanol, may be employed. Chromium complexes may be prepared by reacting alkali chromates with glucose, gluconic acid, and/or other organic compounds of similar structure, such as aldoses and ketoses and their corresponding oxidation products.

The corrosion inhibitor is effective in very small percentages, 1% being the preferred amount for addition. Larger amounts in general produce somewhat improved action but not sufficiently improved to justify larger proportions of inhibitor in general. The use of larger amounts is within the contemplation of this invention, although in practice it is doubtful if more than 5% would ever be employed. The lower limit on inhibitor depends somewhat on the inhibitor itself. When employed in amounts less than 0.1%, however, the results are in general not sufficiently pronounced to classify the material as inhibitors.

Care must be exercised in the addition of inhibitors to avoid adversely affecting the stability of the diacetone mixture.

The following Table I shows a number of tests on buffered inhibited diacetone solutions showing the pH, the relative loss of weight on a test metal, in this case a brass-iron soldered couple, prepared by soldering a strip of brass to a strip of cold rolled steel. In each case the area of the couple exposed to the solution was the same, and the time of exposure was the same. The table also gives the relative evaporation loss and the freezing point of the mixture.

In each case the mixture tested consisted of 60 parts diacetone by volume, 40% buffer by volume, and 1% inhibitor by volume. In those Alox 800 is a polyketohydroxycarboxylic acid produced by the controlled liquid phase oxidation of hydrocarbons.

Table II shows relative corrosion and relative loss of diacetone of the test solution. In the case of relative corrosion, water is taken as 100, and in the case of loss of diacetone, the uninhibited phthalate system is taken as 100.

*Table II*

| Sample | Buffer | Inhibitor | Relative corrosion | Relative loss of diacetone |
|---|---|---|---|---|
| 2 | Phthalate | Acid chrome glucosate | 0.0 | 61 |
| 7 | Phosphate citrate | do | 26 | 31 |
| 8 | do | Sulphonated olive oil | 31 | 15 |
| 10 | do | Alox 800 | 37 | 23 |
| 4 | Phthalate | Sulphonated castor oil | 42 | 54 |
| 9 | Phosphate citrate | do | 43 | 23 |
| 3 | Phthalate | Sulphonated olive oil | 54 | 31 |
| 5 | do | Alox 800 | 59 | 23 |
| 6 | Phosphate citrate | None | 60 | 46 |
| 1 | Phthalate | do | 70 | 100 |
| Water | | | 100 | |

The foregoing detailed description has been given for clearness of understanding only, and no unnecessary limitations should be understood therefrom.

What I claim as new and desire to secure by Letters Patent is:

1. A composition of matter comprising an aqueous system including diacetone and a pH buffering agent in sufficient quantity to produce a pH not substantially above 7.8 and containing a small proportion of an organic corrosion inhibitor.

2. A composition as set forth in claim 1, in which the corrosion inhibitor is of the class consisting of sulfonated non-drying oils, hydroxy-ketones from the liquid phase oxidation of hydrocarbons, polyketohydroxycarboxylic acids and their low molecular weight alcohol esters, and acid chrome glucosate.

3. A composition of matter comprising an aqueous system including diacetone, from 0.1 to 5% of an organic corrosion inhibitor, and a pH buffering agent in sufficient quantity to produce a pH not substantially above 7.8.

4. A composition of matter comprising an aqueous system including diacetone, water, from 0.1 to 5% of an organic corrosion inhibitor, and a pH buffering agent in sufficient quantity to produce a pH not substantially above 7.8.

5. A composition as set forth in claim 4, in which the corrosion inhibitor is present in an amount of approximately 1%.

6. A composition as set forth in claim 1, in which the inhibitor is a sulfonated non-drying oil.

7. A composition as set forth in claim 1, in which the inhibitor is a sulfonated non-drying vegetable oil.

8. A composition as set forth in claim 1, in which the inhibitor is sulfonated castor oil.

9. A composition as set forth in claim 1, in which the inhibitor is sulfonated cottonseed oil.

10. An anti-freeze composition consisting essentially of diacetone, water, from 0.1 to 5% of an organic corrosion inhibitor, based upon the diacetone, and a pH buffering agent in sufficient quantity to produce a pH not substantially above 7.8.

SOPHIA O. WILLIAMS.